US006486880B2

(12) United States Patent
Clark-Schreyer et al.

(10) Patent No.: US 6,486,880 B2
(45) Date of Patent: *Nov. 26, 2002

(54) TRANSMISSION OF PIXEL DATA DEFINING TWO MOTION PHASES OF A GRAPHIC IMAGE

(75) Inventors: Veronika Clark-Schreyer, Vienna (AT); Erwin Erkinger, Vienna (AT)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/674,519

(22) Filed: Jul. 2, 1996

(65) Prior Publication Data

US 2002/0113806 A1 Aug. 22, 2002

(30) Foreign Application Priority Data

Jul. 3, 1995 (EP) ............................................. 95201808
Aug. 25, 1995 (EP) ............................................. 95202304

(51) Int. Cl.$^7$ ......................... G06T 15/70; G06F 17/00; G09G 5/00
(52) U.S. Cl. ...................... 345/473; 345/418; 345/723; 345/838; 345/977
(58) Field of Search ................................ 345/118, 115, 345/112, 201, 150, 189, 121, 122, 473, 474, 475, 327, 418, 723, 838, 977; 364/514; 386/95, 108, 126; 395/152; 382/186, 189

(56) References Cited

U.S. PATENT DOCUMENTS

| 3,848,082 | A | * | 11/1974 | Summers ..................... 345/473 |
| 4,951,039 | A | * | 8/1990 | Scwendeman et al. ...... 345/473 |
| 5,089,899 | A | | 2/1992 | Nomura et al. ............. 386/102 |
| 5,101,364 | A | * | 3/1992 | Davenport et al. ......... 345/723 |
| 5,300,948 | A | * | 4/1994 | Tsujido et al. ............. 345/539 |
| 5,321,517 | A | * | 6/1994 | Takei et al. ................. 345/600 |
| 5,404,316 | A | * | 4/1995 | Klingler ..................... 345/723 |
| 5,452,235 | A | * | 9/1995 | Isani ......................... 364/558 |
| 5,479,602 | A | * | 12/1995 | Baecker et al. ........... 345/838 |
| 5,519,826 | A | * | 5/1996 | Harper et al. .............. 345/473 |
| 5,543,824 | A | * | 8/1996 | Priem et al. ................ 345/559 |
| 5,548,693 | A | * | 8/1996 | Shinya ....................... 345/473 |
| 5,572,646 | A | * | 11/1996 | Kawai et al. ............... 395/473 |
| 5,574,569 | A | * | 11/1996 | Utsumi et al. ................ 386/95 |
| 5,629,723 | A | * | 5/1997 | West et al. ................. 345/539 |
| 5,652,849 | A | * | 7/1997 | Conway et al. ............ 345/835 |
| 5,680,639 | A | * | 10/1997 | Milne et al. ............ 707/500.1 |
| 5,712,964 | A | * | 1/1998 | Kamada et al. ............ 345/418 |
| 5,969,719 | A | * | 10/1999 | Tsujimoto ............... 707/500.1 |
| 5,999,173 | A | * | 12/1999 | Ubillos ....................... 345/724 |

* cited by examiner

Primary Examiner—Steven Saras
Assistant Examiner—Paul A. Bell
(74) Attorney, Agent, or Firm—Laurie E. Gathman (57) ABSTRACT

A method and arrangements for transmitting, receiving and displaying graphic images. The graphic images include dynamic icons (dynacons), i.e. graphic subpictures comprising two or more motion phases. By alternately displaying said motion phases, an attractive motion is created. They enhance the appearance of graphic images considerably. This is especially useful in the transmission of an electronic television program guide, e.g. to indicate the type of television programs to come.

4 Claims, 5 Drawing Sheets

TRANSMISSION OF PIXEL DATA DEFINING TWO MOTION PHASES OF A GRAPHIC IMAGE

BACKGROUND OF THE INVENTION

The invention relates to a method of transmitting graphic images, comprising the step of transmitting data defining pixels of a displayable subpicture, and the step of transmitting data invoking said subpicture for display on a receiver. The invention also relates to a television receiver and a display device for receiving and displaying said graphic images.

A method of transmitting graphic images is generally known as teletext. Herein, images are transmitted in the form of pages, each page comprising a plurality of character codes defining the alphanumeric and graphical characters of said page. Pixel patterns defining the commonly used characters are stored in a read-only memory section of the receiver. The known arrangements render it possible for characters, or series of characters, to "flash", i.e. to be concealed and revealed at a predetermined frequency. This allows a dynamic effect to be added to a page.

More sophisticated teletext systems (level 3) provide a feature usually referred to as "Dynamically Redefinable Character Sets". This feature allows a page editor to define the pixel pattern of characters at the transmitter end, and to download said patterns to the receiver for storage in a random access memory prior to the transmission of the page.

SUMMARY OF THE INVENTION

It is an object of the invention to further improve the appearance of an image on screen.

According to the invention, the method is characterized in that the step of transmitting pixel defining data includes the transmission of pixel defining data for at least two motion phases of said subpicture to be displayed cyclically. The transmission step may include the transmission of a time code representing a time interval between displaying the successive motion phases of said subpicture. The graphic image can thus be enhanced with dynamic icons ("dynacons").

DETAILED DESCRIPTION OF THE PREFERRED EMBODIMENTS

Figure 1:
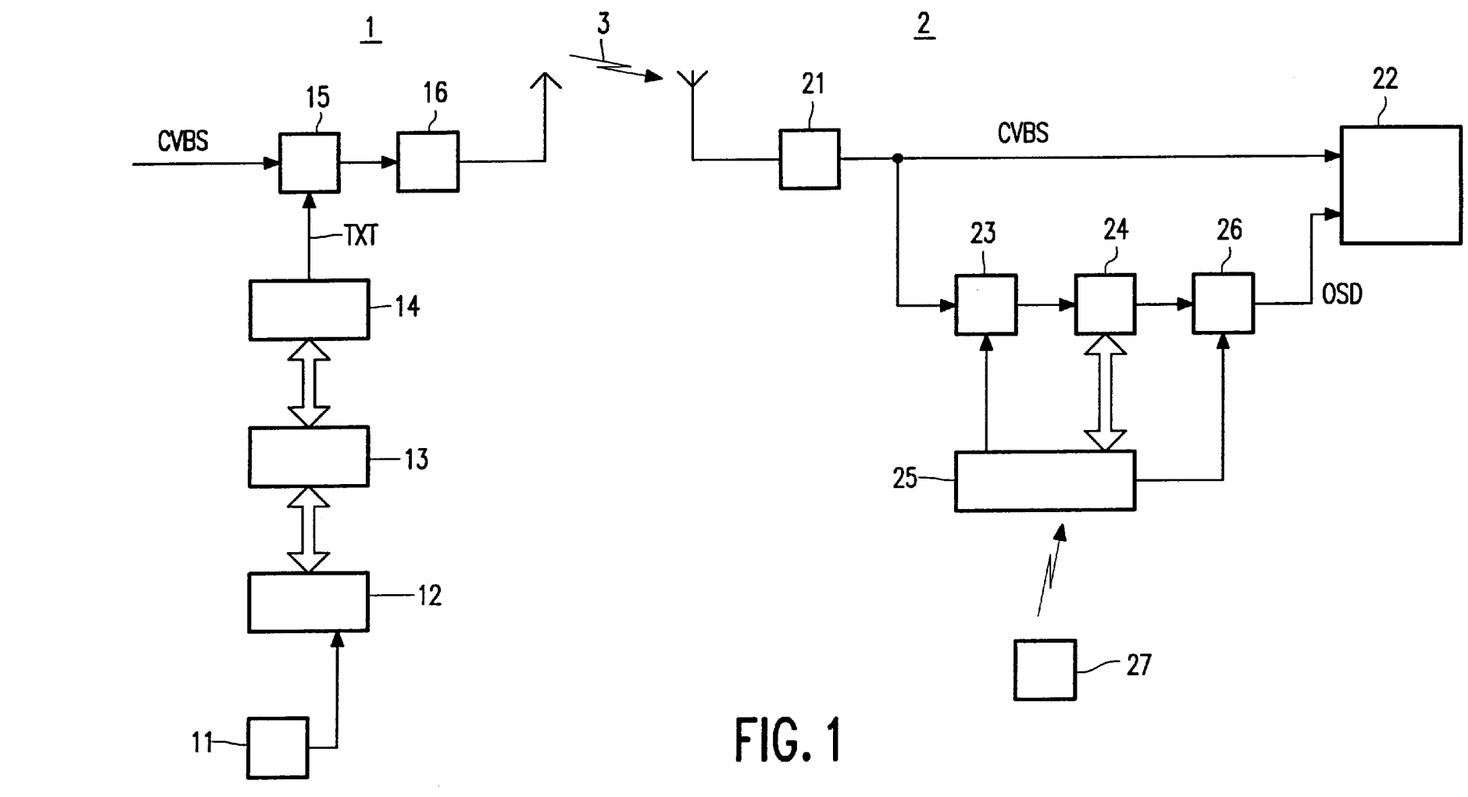
FIG. 1 shows a system comprising a transmitter and a receiver according to the invention.

The invention will now be described with reference to the transmission of menus for accessing a (separately transmitted) electronic TV programme guide. The invention, however, is not restricted to this application. FIG. 1 shows a system comprising a transmitter 1 and a receiver 2 according to the invention. The transmitter comprises an editing terminal 11 for creating textual and graphical information, a processor 12, a memory 13 for storing the information, and a page composer 14 for packing the information into teletext pages TXT. The transmitter further comprises a teletext inserter 15 for inserting the teletext pages in the flyback period of a composite video signal CVBS. The thus obtained television signal is applied to a modulator 16 for broadcast over a transmission medium 3.

The receiver comprises a tuner 21 for receiving the television signal. The received signal is directly applied to a television monitor 22 so as to display the television programme. The signal is also applied to a teletext data decoder 23 which is adapted to acquire selected teletext pages and to store them in a memory 24. A microprocessor 25 is connected to decoder 23 so as to apply the relevant page numbers, and is further connected to the memory 24 so as to process the information stored therein. The receiver further comprises a graphic generator 26 adapted to read a predetermined display segment of memory 24 and to generate an On-Screen-Display picture OSD defined by data stored in said memory segment. The OSD picture includes a cursor, the position of which is defined by the microprocessor in response to positioning signals from a remote cursor control device 27.

In practice, the receiver described above may take the form of a videorecorder. The videorecorder may have an embedded display device 22 or an output for applying the display signals CVBS and OSD to a separate display device 22 such as a television set.

Operation of the Transmitter

The electronic programme guide as well as the menus for accessing and presenting the programme guide are created by editorial staff using editing terminal 11. The information is processed by processor 12 and stored in various segments of memory 13. Each memory segment defines an amount of data which will further be referred to as a section of the database. The page composer 14 packs each section in one or more teletext pages. As the teletext pages are not intended for direct display, they have hexadecimal page numbers. Data which is most sensible data to transmission errors, such as headers, dates and times, string lengths, teletext page numbers, etc., are protected by a Hamming code. The first teletext page has a predetermined page number (e.g. 3A0) and contains a table of content. This is a list of teletext page numbers carrying the data stream. If the table of content does not fit in one teletext page, a reference to subsequent teletext pages is made.

Figure 2:
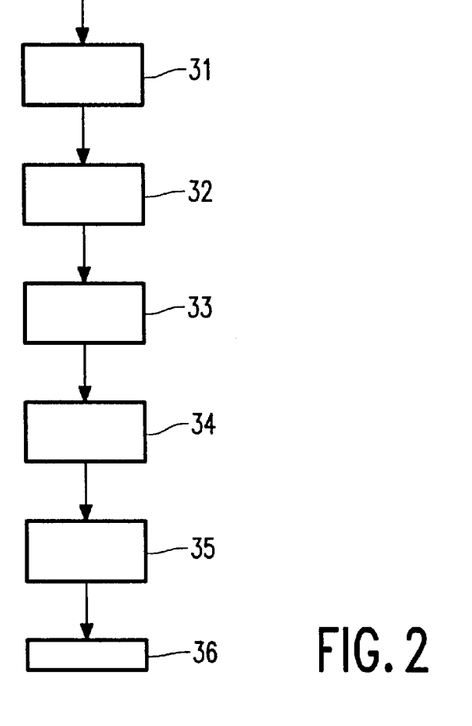
FIG. 2 shows a flowdiagram of transmission steps executed by the transmitter of FIG. 1.

FIG. 2 shows a flowdiagram of transmission steps executed by the transmitter of FIG. 1. Each step represents the transmission of a section of the database. Each section relates to a certain functionality and comprise data items such as parameters, values, text strings, attributes, etc. In a step 31, a Basic Info section is transmitted comprising basic data such as date and time and some other general data so as to ease the management of memory in a television receiver. In a step 32, a Layout Info section is transmitted defining a variety of design tools for composing the electronic programme guide. In a step 33, a Graphics section is transmitted in which a plurality of graphic subpictures is defined for display on screen. In a step 34, a Menu Info section is transmitted conveying the menus for accessing the program guide. In a step 35, a Programme Info section is transmitted for building up the TV programme guide database. The transmission of the database ends with a step 36 of transmitting an End-of-Protocol code. The database is transmitted regularly, e.g. a few times per day.

The sections will now be described in more details. As not all section are equally essential to the invention, some sections will only briefly be discussed. In the following description, sections are shown in double framed boxes. A collection of data items in a section may constitute a block. Blocks are shown in single framed boxes. A ++ symbol is placed next to a data item or block if it is repeatedly transmitted. For example, a section:

comprises three data items of which the block comprising item_2 and item_3 may be repeated. Each section starts with a header. This is a code identifying the section and indicating its beginning. The type of the data items (such as byte, character, string) is not given here because it is not essential to the invention.

The Section Basic Info

This section comprises basic data such as date and time and some other general data so as to ease the management of memory in a television receiver. The Basic Info section has the following format:

```
BASIC_HEADER
date
time
no_programmes
no_menuitems
no_graphics
poolsize
```

Herein, date and time represent the date and time of issue of the database. No_programmes is the number of television programmes contained in the Programme Info section. No_menuitems is the number of menu items in the Menu Info section. No_graphics is the total number of graphics, including the logos defined in the Table Info section. Poolsize is the total size of all the titles, programme infos and descriptions and criteria names.

The Section Layout Info

This section gives a variety of design tools to the supplier of the electronic programme guide. The format of this section is:

No_of_colours and colour++ define the length and contents, respectively, of a colour look up table. By default, a standard teletext colour table is used. The rest of the section specifies the appearance of the various menus on screen. Screensize gives the full screen size in pixels, in horizontal and vertical direction. Because the menus are organized in a tree structure, each menu is assigned a level of which there are no_of_levels available. As will be described later, two menus of different levels may be displayed simultaneously. This is referred to as an "arrangement". The number of arrangements is specified by no_of_arrgmnts. The item layout_data is a block of data defining features such as height, font, colours, position, spacing, etc., of headlines and menu items of the menu.

The Section Graphics

Figure 3:
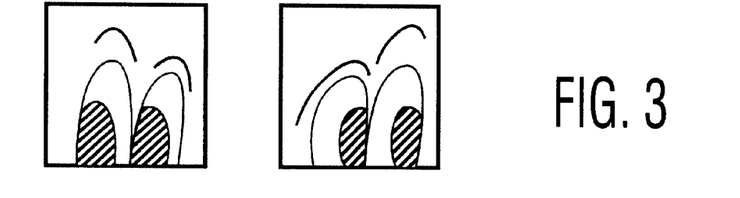
FIGS. 3–7 show examples of subpictures having different motion phases for display by the receiver shown in FIG. 1.
Figure 4:
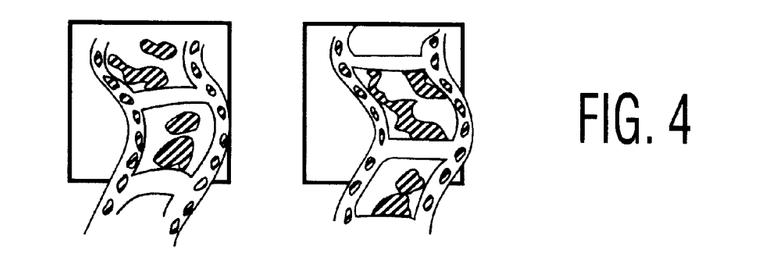
Figure 5:
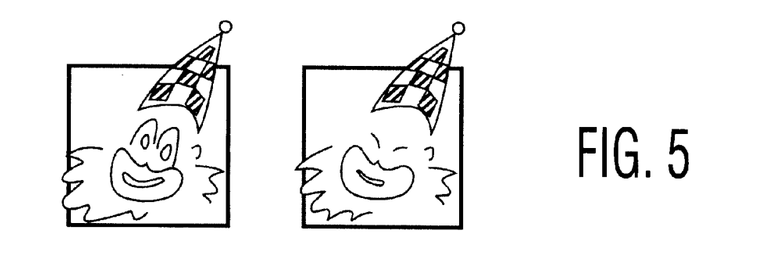
Figure 6:
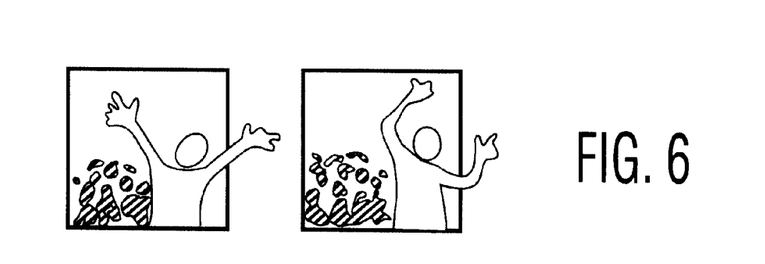
Figure 7:
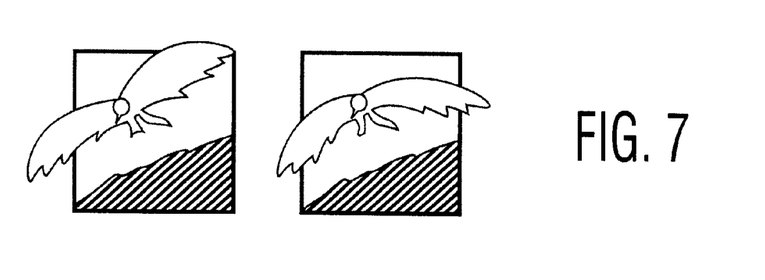

In this section, one or more graphic subpictures (hereinafter also referred to as "graphics" for short) are defined which can be displayed on screen. The general format of this section is:

Herein, no_grphcs gives the number of graphics defined in the section. Grphc$_{13}$ no is an index number for invoking the subpictures. The data item graphic itself is a block of data defining a rectangular subpicture. Four types of graphics are being distinguished in this protocol: bitmaps, symbols, dynacons, and text strings. A bitmap is the general term for a graphic. It is a rectangular matrix of pixels forming a subpicture. Symbols and dynacons are bitmaps as well, but with special conventions. Symbols are intended for use within text strings. A text including a symbol comprises an escape character followed by graphic_no to invoke the symbol. Dynacons consist of a predefined sequence of 2 or more bitmaps. Each bitmap represents one motion phase of the dynacon. By cyclically displaying said motion phases, the viewer sees one bitmap after the other, which becomes manifest as a simple animation of the subpicture. The period of time during which each phase is to be displayed can be fixed in the receiver, or may be transmitted as a data item in the section. A dynacon with one single phase is a symbol. The phases "overload" the colour table, per phase there is one complete colour table as common from a bitmap. Dynacons can be used like symbols. FIGS. 3–7 show examples of dynacons, each having two motion phases. The two motion phases shown in FIG. 3 give an impression of blinking eyes for drawing the user's attention to a particular piece of information. FIGS. 4–7 are intended to be added to a preview of a television programme. FIG. 4 represents a movie, FIG. 5 represents a programme for children, FIG. 6 a live performance, and FIG. 7 shows two phases giving an impression of flapping wings so as to represent a documentary film about the bird's life.

Bitmaps, symbols and dynacons may be encoded either pixel-by-pixel or by using a run-length code. Both the type of graphics and the method of encoding are defined by the section header which has a plurality of possible values for this purpose.

For pixel-by-pixel encoded bitmaps, symbols and dynacons, the format of the block graphic is:

> bits_per_colour
> colour_table
> x_tlcorner
> y_tlcorner
> x_xtns
> y_xtns
> pixel_block Herein, bits_per_colour defines the number of colours which can be used, and colour_table is an array of three values defining each colour in terms of red, green and blue levels. The parameters x_tlcorner and y_tlcorner define the position of the bitmap on screen in terms of a character location. The parameters x_xtns and y_xtns define the size of the bitmap on the screen in pixels. Pixel_block defines the colour of each pixel in terms of an index to the colour look up table in a predetermined scanning order. Every colour index consists of bits_per_colour bits.

For run-length-encoded bitmaps, symbols and dynacons, the format of the block graphic is:

> bits_per_colour
> colour_table
> x_tlcorner
> y_tlcorner
> x_xtns
> y_xtns
> pblsize
> pixel_block The same definitions as above apply. The parameter pblsize defines the size of pixel_block which now accommodates a plurality of run-length codes. Methods for run-length coding graphic images are generally known.

The Section Menu Info

The section Menu Info conveys the menus to access the program guide and can also be used to transport non-programme information, e.g. news or help. It defines a hierarchically structured tree of charts, each chart consisting of a headline and several items. Each item may expand to a new, more detailed sub chart. The transmission format of the section Menu Info is shown in the following Table:

Item_no is an item number assigned to a menu_item in the range from 0 up to and inclusive no_of_items-1. Level is an unsigned number, telling how deep in the tree the menu comprising this item lays. Menu_item is a string of characters representing an information item. The first menu_item at a given level of a menu is the headline of said menu.

Basically, the text string defined by menu_item is to be displayed as such as a menu item on screen. However, if its first character is a special character, menu_item represents a reference to a string stored elsewhere in a television receiver, e.g. a piece of text in a particular teletext page, or a programme title transmitted in the Programme Info section.

Each menu_item in the section may have zero, one or more attributes assigned to it, the number of attributes being given by no_of_attributes. An attribute is a block of data comprising a header defining the attribute as well as the kind and format of the subsequent data. Some attributes enhance or extend the menu item, others define a criterion to be applied to the stored information items so as to obtain a list of information items fulfilling said criterion. Some examples of attributes will now be described.

Attributes INS_DATE and INS_TIME specify that the current date and/or time are to be inserted in the menu item. A specification of the display format (e.g. "14:22" or "2.22 a.m.") may be included.

An attribute GRPHCS specifies the graph_no of a graphic subpicture to be displayed. If the attribute is connected to a menu headline (the first menu_item at a given level), the subpicture is to be displayed during the time that the relevant menu is displayed. If the attribute is connected to selectable menu items, the subpicture pops up when the cursor touches that item on screen.

An attribute LINKEDITEM establishes a link between a menu item and other displayable information so as to display both simultaneously. Some possible links (e.g. to graphic subpictures) have already been mentioned. The attribute can be added to menu items as well as programmes (see section Programme Info). The display area where to put the linked element on screen is specified. The linked item is displayed whenever the item with the attribute is the only one on the screen or whenever the cursor touches it. Links can be established to an element of a different section or to a (piece of a) teletext page. A link can also by itself define a text string to be displayed. This is defined by a code immediately following the attribute header.

An attribute MULTILEVEL instructs the receiver to display two levels of a menu simultaneously on one screen. The attribute is added to the headline of a menu at a given level, and specifies whether the next higher level or the next lower level is to be displayed.

The Section Programme Info

Whereas the section Menu Info is to construct a menu tree to navigate through the database, the section Programme Info is to build up the database of television if programmes.

The section conveys all programmes, which become available within the program guide, and contains all the necessary information needed for searching programmes fulfilling a certain criterion (e.e. data and time of transmission, category). A detailed explanation is omitted here as it is not relevant to the invention.

Example of a Menu Page

Figure 8:
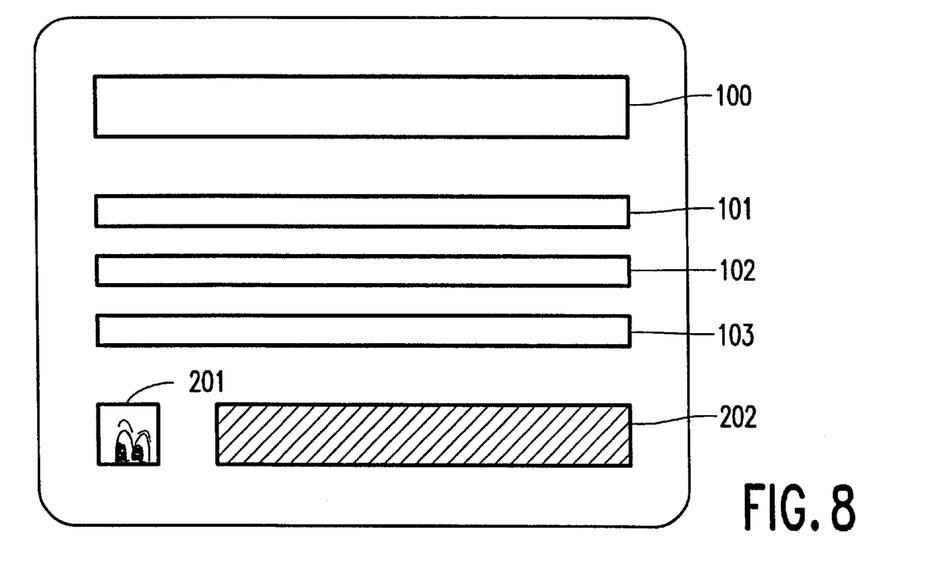
FIG. 8 shows an image to be displayed by the receiver of FIG. 1.

FIG. 8 shows an example of a menu page to be displayed. The menu comprises a headline 100 (e.g. the string "MAIN MENU"), a first menu item 101 (e.g. "TV Guide"), a second menu item 132 ("FastFinder") and a third menu item 150 ("User's Guide"). The image further includes a subpicture 202, e.g. an important broadcaster message. In order to draw the user's attention to said message, a dynacon 201 is displayed next to it. The relevant data in the section Menu Info for defining the screen of FIG. 8 is: Herein, item number 0 defines the headline whereas item numbers 1–3 define three menu items which are selectable the user. The two attributes {GRPHCS, . . . } attached to the     item_no=0, level=0, item="MAIN MENU", no_of_attributes=2,
        attribute={GRPHCS, . . . }, {GRPHCS, . . . };
    item_no=1, level=0, item="TV Guide", no_of_attributes =0;
    item_no=2, level=0, item="FastFinder", no_of_attributes=0;
    item_no=3, level=0, item="User Guide", no_of_attributes=0;

headline invoke subpictures 201 and 202 to be displayed. The attributes include a parameter graphic_no (see Graphic Info section) so as to identify the location of the subpicture in the relevant memory segment of the receiver.

Operation of the Receiver

Figure 9:
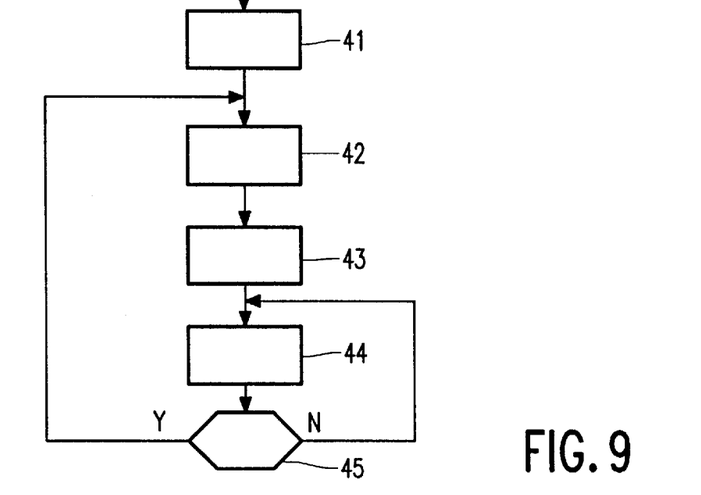
FIG. 9 shows a flow chart of operations carried out by a microprocessor shown in FIG. 1.

The operation is determined by a control program stored in a memory of microprocessor 25 (FIG. 1). FIG. 9 shows a flow chart of operations carried out by the microprocessor. In an initial step 41, the processor determines the sequence of teletext pages constituting the database. As already mentioned above, a predetermined page comprises the list of pages to be acquired. In the step 41, the processor applies the relevant page numbers to the data decoder 23 (FIG. 1). As each page arrives, the data accommodated therein are stored in memory 24 (FIG. 1). The processor sorts the received data so as to store each section of the database in a corresponding segment of said memory. During this process, the user may use the television receiver for other purposes, e.g. watching a television programma. The process may also be carried out in a standby state of the receiver, e.g. during the night.

A step 42 is executed when the user desires to consult the television program guide. In this step, the processor searches, in the memory segment holding the Menu Info section, all items relevant to the menu to be displayed. For the initial main menu, this step is equivalent to searching all items having level=0. In a step 43, the menu is composed and displayed using the display parameters such as text font, height, spacing, colour, etc. as defined in the Layout Info section stored in a predetermined segment of memory 24 (FIG. 1). The processor further checks whether an attribute {GRPHCS, . . . } is associated with the headline. Actions in response to such an attribute will be described in more details in the paragraph "Description of receiver embodiments".

In a step 44, the processor controls the position of a cursor displayed on screen in response to cursor positioning signals from remote cursor control device 27 (FIG. 1). In a step 45, the processor determines whether a menu item is selected by the user.

If that is not the case, the processor returns to step 44 so as to reposition the cursor in response to the positioning signals received from remote control device 27 (FIG. 1). If a menu item is selected, the processor returns to step 42 so as to display a new menu.

Description of Receiver Embodiments

Figure 10:
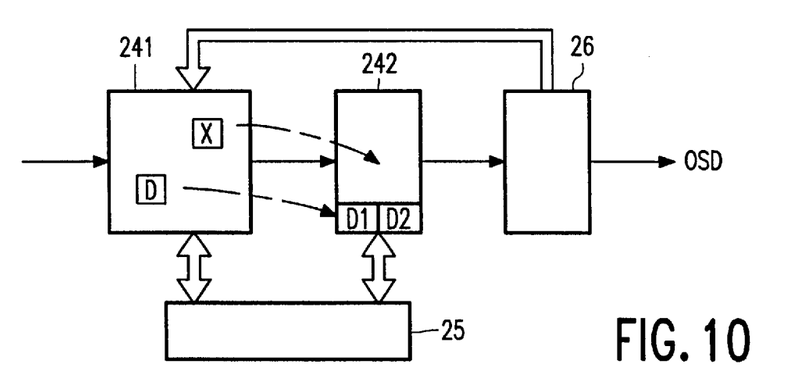
FIGS. 10–12 show embodiments of the display section of the receiver shown in FIG. 1.

FIG. 10 shows, in more details, a first embodiment of the display section of receiver 2 (FIG. 1). This embodiment relates to a character-based display device. Memory 24 (FIG. 1) of the receiver comprises a segment 241 in which a character code is stored for each character to be displayed, a read-only segment 242 keeping the pixel patterns of common alphanumeric symbols, and a random-access memory segment 243 keeping the pixel patterns (D1,D2) of the motion phases of dynacons. The character codes are successively read-out, from left to right and from top to bottom, in response to read addresses supplied by graphic generator 26. Character codes X representing a common symbol address a respective location in ROM section 242. Character codes D representing a dynacon address a respective location in RAM section 243. The pixels stored in the addressed segment are applied to graphic generator 26 and displayed on television monitor 22 (FIG. 1). In order to obtain the desired animation, the processor 25 cyclically writes the character codes for motion phases D1 and D2 in memory segment 241.

Figure 11:
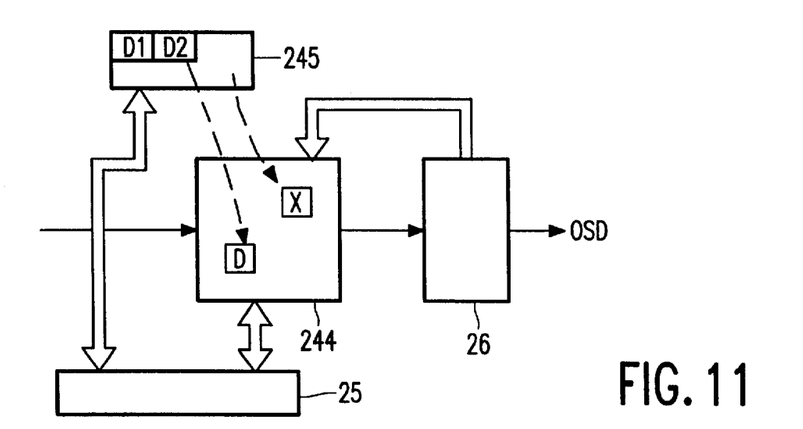

FIG. 11 shows a second embodiment. This embodiment relates to a bit-mapped device. Memory 24 (FIG. 1) of the receiver now comprises a memory segment 244 having a memory location for each individual pixel to be displayed, and a memory segment 245 for keeping the pixel patterns of common alphanumeric symbols as well as the pixel patterns of the motion phases (D1,D2) of dynacons. Both segments are of the RAM type. In order to display an image, the processor 25 copies the relevant pixel patterns stored in segment 245 to segment 244. The processor alternately writes the pixel patterns D1 and D2 into the part of memory 244 denoted D so as to form a dynacon. The pixels stored in segment 244 are successively read-out, from left to right and from top to bottom, in response to a read address supplied by graphic generator 26.

Figure 12:
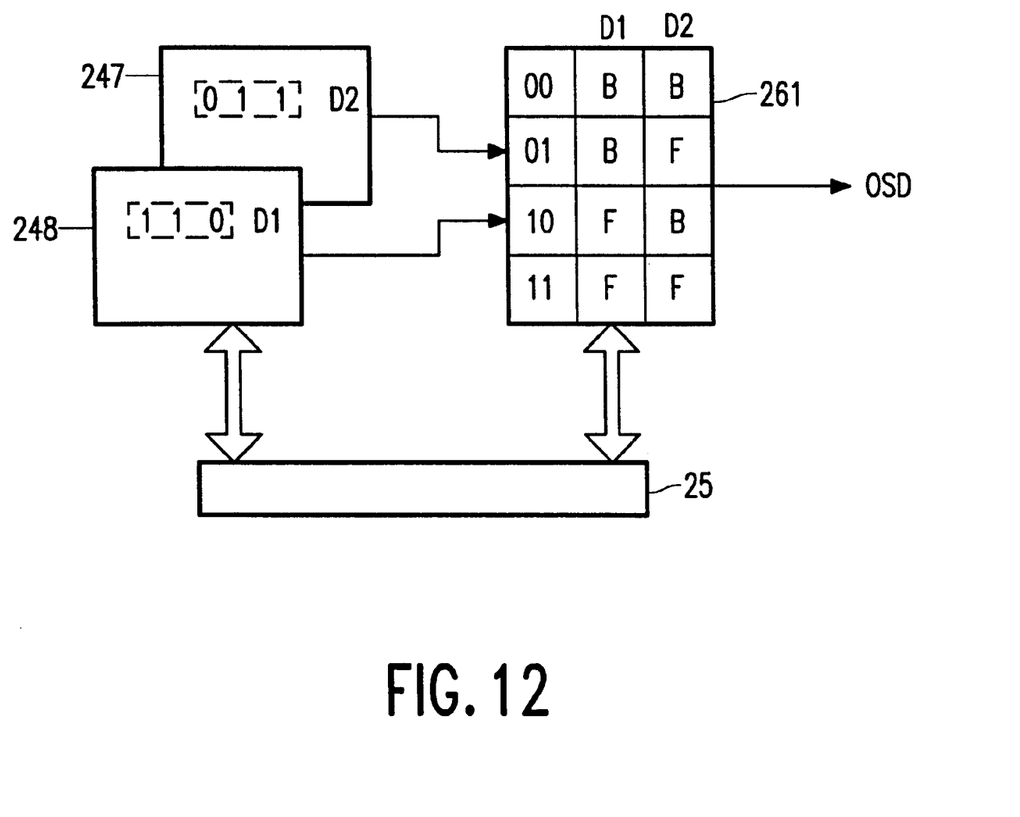

FIG. 12 shows a third embodiment. A bit-mapped memory segment now comprises two or more layers 247 and 248, one for each motion phase. In the embodiment shown, two 1-bit layers are provided. Both layers are read-out simultaneously so as to obtain a 2-bits value for each pixel. The pixel values are applied to a colour-look-up-table 261 (CLUT) included in graphics generator 26 (FIG. 1) and address a colour definition stored therein. The processor cyclically updates the CLUT or, what is equivalent, switches between two different CLUTs. The elucidate the operation of this embodiment, motion phase D1 having a 1-bit wide pixel pattern 110 is stored in layer 248 and motion phase D2 having a pixel pattern 011 is stored in layer 247. The two motion phases are supplied to CLUT 261 as 2-bit wide pixels 01, 11 and 10, successively. For displaying motion phase D1, a background colour B and foreground colour F are stored in the CLUT as indicated in column D1. For displaying motion phase D2, the colours are stored as indicated in column D2. As can readily be understood, the switching from column D1 to column D2 causes the effect of a horizontal piece of a line which moves to the right.

It is noted that the graphic picture data are not necessarily to be accommodated in the vertical flyback period of a broadcast television signal. They can also be transmitted via a telephone network or computer network (e.g. Internet), or distributed on storage media such as CDROM or computer diskettes. Accordingly, the receiver may take the form of a data processing and display unit (e.g. a personal computer), provided with an appropriate interface circuit ("extension card") for receiving the data signals.

In summary, a method and arrangements for transmitting, receiving and displaying graphic images is disclosed. The graphic images include dynamic icons (dynacons), i.e. graphic subpictures comprising two or more motion phases. By alternately displaying said motion phases, an attractive motion is created. They enhance the appearance of graphic images considerably. This is especially useful in the transmission of an electronic television program guide, e.g. to indicate the type of television programs to come.

What is claimed is:

1. A method of transmitting graphic images, comprising the steps of:

transmitting data defining pixels of a displayable subpicture comprising at least two motion phases of the subpicture;

transmitting data invoking said subpicture for display on a receiver, characterized in that the step of transmitting pixel defining data includes i.) transmitting pixel defining data for at least the two motion phases of said subpicture so that an animation of the subpicture can be displayed and thereby create a dynacon, and ii.) the transmission of a time code representing a time interval between displaying the successive motion phases of said subpicture, the time interval being changeable from transmission to transmission; and successively and cyclically reading the motion phases from a memory and cyclically displaying said phases recurrently for a time period.

2. A transmitter for transmitting graphic images, comprising:

means for transmitting data defining pixels of a subpicture comprising at least two motion phases of the subpicture to be stored in a receiver;

means for transmitting data invoking said subpicture for display on said receiver, characterized in that the means for transmitting pixel defining data is adapted to include i.) the transmission of pixel defining data for at least two motion phases of said subpicture so that an animation of the subpicture can be displayed and thereby create a dynacon, and ii.) the transmission of a time code representing a time interval between displaying the successive motion phases of said subpicture, the time code being changeable from transmission to transmission; and means for successively and cyclically reading the motion phases from a memory and cyclically displaying said phases recurrently for a time period.

3. A display signal generator for generating graphic image display signals, comprising:

a first memory for storing data defining pixels of a subpicture comprising at least two motion phases of the subpicture;

a second memory for storing data invoking said subpicture for display; and a graphic generator for reading said first memory in response to invoking data stored in said second memory so as to generate pixels of the subpicture on a display, characterized in that said first memory is adapted to store the pixel defining data for at least two motion phases of said subpicture, said graphic generator being adapted, in response to the invoking data to successively and cyclically read from said first memory the data defining stored pixel invoking data motion phases of the subpictures to display the motion phases cyclically and recurrently for a time period, so that an animation of the subpicture can be displayed and thereby create a dynacon and further including a receiver being adapted for receiving a time code, representing a time interval, the time interval being changeable from transmission to transmission, wherein said graphic generator adapted to cyclically read, in accordance with the time interval, the motion phases stored in response to the invoking data.

4. Receiver for receiving and processing graphic image display signals, said receiver comprising:

a display signal generator comprising:

a first memory for storing data defining pixels of a subpicture comprising at least two motion phases of the subpicture;

a second memory for storing data invoking said subpicture for display; and a graphic generator for reading said first memory in response to invoking data stored in said second memory so as to generate pixels of the subpicture on a display, characterized in that said first memory is adapted to store the pixel defining data for at least two motion phases of said subpicture, said graphic generator being adapted, in response to the invoking data, to successively and cyclically read from said first memory the data defining stored pixel invoking data motion phases of the subpictures to display the motion phases cyclically and recurrently for a time period, so that an animation of the subpicture can be displayed and thereby create a dynacon and further including said receiver being adapted for receiving a time code, representing a time interval, the time code being changeable from transmission to transmission, wherein said graphic generator adapted to cyclically read, in accordance with the time interval, the motion phases stored in response to the invoking data.

* * * * *